(12) United States Patent  (10) Patent No.: US 8,123,184 B2
Hori  (45) Date of Patent: Feb. 28, 2012

(54) DEVICE-MOUNTING STAND

(75) Inventor: Masatoshi Hori, Osaka (JP)

(73) Assignee: Panasonic Corporation, Osaka (JP)

( * ) Notice: Subject to any disclaimer, the term of this patent is extended or adjusted under 35 U.S.C. 154(b) by 125 days.

(21) Appl. No.: 12/446,522

(22) PCT Filed: Oct. 30, 2007

(86) PCT No.: PCT/JP2007/071076
§ 371 (c)(1),
(2), (4) Date: Apr. 21, 2009

(87) PCT Pub. No.: WO2008/093456
PCT Pub. Date: Aug. 7, 2008

(65) Prior Publication Data
US 2010/0187377 A1  Jul. 29, 2010

(30) Foreign Application Priority Data
Jan. 31, 2007  (JP) ................................. 2007-020832

(51) Int. Cl.
A47B 96/00  (2006.01)
(52) U.S. Cl. ................ 248/225.21; 248/917; 361/679.21
(58) Field of Classification Search .................. 248/690, 248/692, 322, 227.1, 220.21, 220.22, 223.41, 248/225.11, 225.21, 304, 339, 301, 489; 150/158; 108/90; 297/218.5
See application file for complete search history.

(56) References Cited

U.S. PATENT DOCUMENTS

| | | | | |
|---|---|---|---|---|
| 5,357,874 A | * | 10/1994 | Palmer | 108/50.02 |
| 6,594,144 B1 | * | 7/2003 | Miles | 361/679.22 |
| 7,564,679 B2 | * | 7/2009 | Chen et al. | 361/679.21 |
| 2005/0139745 A1 | * | 6/2005 | Liao et al. | 248/346.01 |
| 2006/0214072 A1 | | 9/2006 | Lee | |

FOREIGN PATENT DOCUMENTS

| | | |
|---|---|---|
| DE | 20 2006 012 336 U1 | 12/2006 |
| DE | 20 2007 012 730 U1 | 1/2008 |
| JP | 4-23377 | 2/1992 |
| JP | 2000-341608 A | 12/2000 |
| JP | 2000341608 A * | 12/2000 |
| JP | 2002-77773 A | 3/2002 |

OTHER PUBLICATIONS

Supplementary European Search Report for EP 07 83 0810, Jul. 23, 2010.
"Safty Latch for Vertical Stand", IBM Technical Disclosure Bulletin, International Business Machines Corp., Thornwood, US, vol. 34, No. 7A, pp. 14-15, Dec. 1991.
International Search Report for PCT/JP2007/071076, Dec. 25, 2007.

* cited by examiner

Primary Examiner — Amy Sterling
Assistant Examiner — Erin W Smith
(74) Attorney, Agent, or Firm — RatnerPrestia

(57) ABSTRACT

A device-mounted stand includes a support leg for supporting a device placed and fixed on a base, a cover disposed on the support leg in a vertically slidable manner for covering a front face of the support leg, and an elastic device applying an upward force to the cover. The elastic device makes a lower end of the device placed on the support leg and an upper end of the cover contact without any gap. This achieves the integration of the stand and the device placed on it.

12 Claims, 14 Drawing Sheets

DEVICE-MOUNTING STAND

This application is a U.S. National Phase Application of PCT International Application PCT/JP2007/071076.

TECHNICAL FIELD

The present invention relates to device-mounting stands for placing devices, such as TV sets.

BACKGROUND ART

Devices such as TV sets are often placed on items of furniture or on exclusively-designed stands.

Stands created exclusively for TV models are designed to match the TV set to be placed on it, and thus stands have also been proposed that are integrated with the TV placed on them.

However, since the device and the stand are separate pieces, there is inevitably a gap between the TV set and the stand.

Therefore, cover 103 that matches the shape of the bottom of the TV set 101 is provided on stand 102 for TV set 101, as shown in FIGS. 14A and 14B. TV set 101 is placed on cover 103 to fill the gap created between TV set 101 and stand 102 so as to integrate TV set 101 and stand 102. For example, this is proposed in Patent Document 1.

However, a conventional structure can mostly fill the gap between TV set 101 and stand 102 by providing cover 103 to the gap between TV set 101 and stand 102. However, a visible gap remains between cover 103 and TV set 101.

In particular, gap 105 remaining at the front of the bottom of TV set 101 is extremely unpleasant to the eye of a user who expects an integrated design for TV set 101 and stand 102.

Furthermore, narrow gap 105, made narrower by the use of cover 103, is difficult to clean; and dust that accumulates in gap 105 is extremely unpleasant to the eye of the user, since it is in the front bottom of TV set 101.

Patent Document: Japanese Patent Unexamined Publication No. 2002-77773

SUMMARY OF THE INVENTION

A device-mounting stand of the present invention includes a base, a support leg for supporting a device placed on the base, a cover for covering a front face of the support leg and attached to the support leg in a vertically slidable manner, and an elastic device for applying an upward force to the cover.

The upward force applied to the cover by the elastic device makes the upper end of the cover contact the lower end of the device when the device is mounted on the support leg. Accordingly, the device is placed on the stand with no gap via the cover, achieving the integration of device and stand. At the same time, elimination of the gap between the device and the stand prevents dust from being accumulated in the gap and saves time spent for cleaning.

REFERENCE MARKS IN THE DRAWINGS

Figure 1:
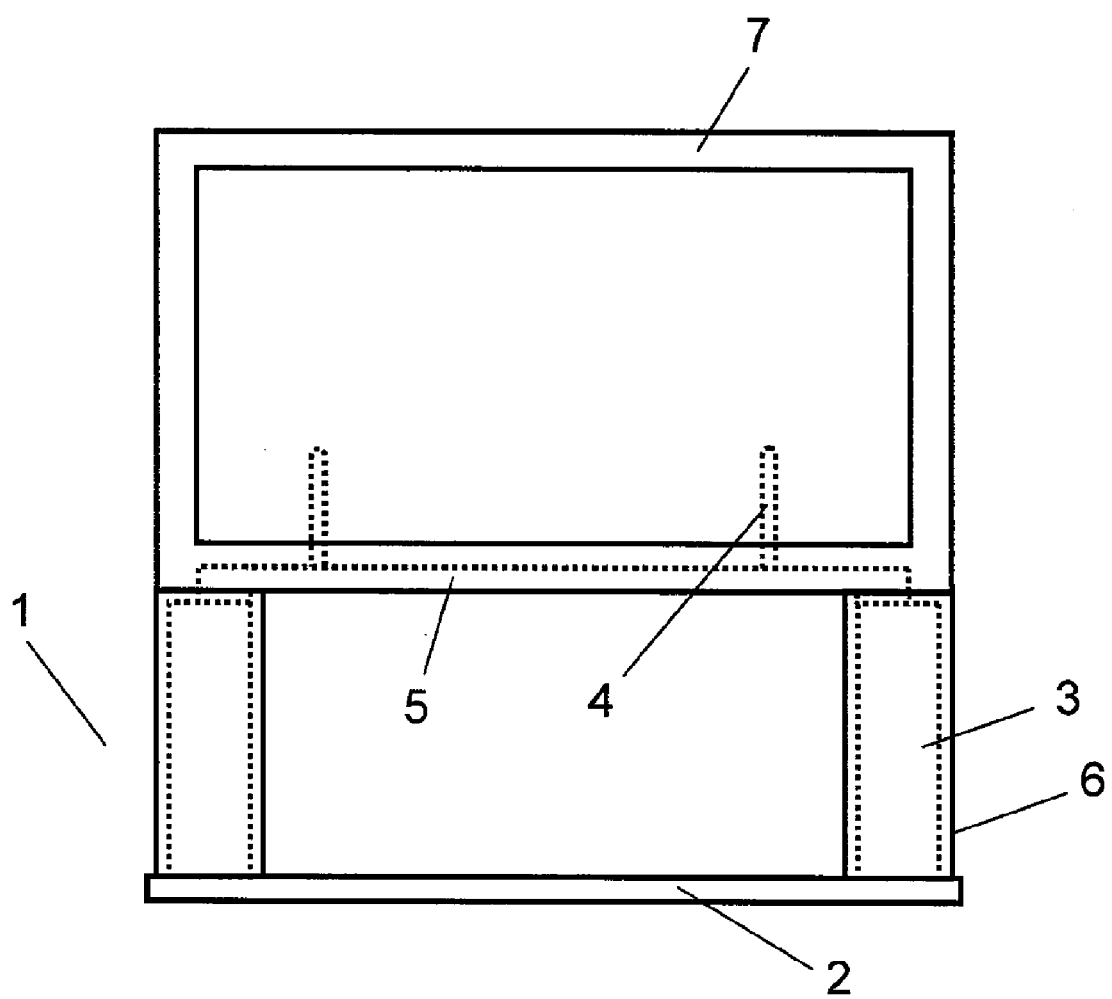
FIG. 1 is a front view of a state where a device is placed on a device-mounting stand in accordance with a first exemplary embodiment of the present invention.

1 Stand
2 Base
3, 9 Support leg
3a, 9a Front part
3b, 9b Rear part
3c Attachment protrusion
4 Support bar
5 Connecting member
6, 10 Cover
6a, 10a Gap
6, 10b Front upper end
6c, 10c Lower end
6d Side
6e Attachment groove
6f Wall
6g Upper end
7 Device
8a, 8b Groove
9c Frame
9d Upper end
9e Protrusion
9f Fitting device
9g Fitting part
11, 12 Elastic device
11a, 12a Hole
11b, 12b Elastic part
11c, 12c Fixing part
11d Contact part
13 Second elastic device
14 Support-leg fixing member
14a Frame
14b Holder
14c, 14d, 14e, 14f Sliding face
14g Holding part
14h Corner

DETAILED DESCRIPTION OF PREFERRED EMBODIMENTS

The present invention includes a base, a support leg for supporting a device placed on the base, and a cover for covering a front part of the support leg. The cover is installed to the support leg in a vertically slidable manner.

Since the cover that is covering the front part of the support leg is vertically slidable, the upper end of the cover can be attached to a lower end of the device without any gap. This enables the integration of the device and the stand. In addition, elimination of the gap between the device and the stand also keeps out dust, eliminating the need for cleaning.

The present invention further includes an elastic device for covering the front part of support leg and applying an upward force to the vertically slidable cover.

The use of the elastic device for applying the upward force to the cover makes the upper end of cover and the lower end of device contact without any gap. This enables the integration of the device and the stand. In addition, elimination of the gap between the device and the stand also keeps out dust, eliminating the need for cleaning.

The present invention has a groove formed at an installation area of a support leg on the base, so as to insert the lower end of the cover that comes down against the elastic device.

The cover slides down against the elastic device when the cover contacts the lower end of device. The lower end of cover is also inserted into the groove formed in the base. This achieves a structure that entirely covers the front face of support leg. Accordingly, the cover making contact with the device without any gap also looks integrated with the base, effectively integrating the device and the stand.

The present invention has the cover whose front upper end is the highest. This makes the front upper end reliably contact with the lower end of device without any gap, ensuring the integration of the device and the stand.

In the present invention, the elastic device is integrally formed with the support leg. This eliminates the need for handling the elastic device as a separate component, and thus achieves easier assembly.

In the present invention, the elastic device is formed integrally with the cover. This eliminates the need for handling the elastic device as a separate component, and thus achieves easier assembly.

In the present invention, the elastic device is disposed between the lower end of cover and the groove. This achieves a structure that prevents dust and other particles from entering into the groove.

In the present invention, a rear part of the support leg is made narrower than a front part of the support leg so that the rear part hides behind the front part. Accordingly, the cover covering the front part of the support leg can hide the entire support leg.

In the present invention, the cover has a U-shaped cross section so as to hide the front part of support leg. Accordingly, the cover can effectively cover and hide the support leg.

In the present invention, the cover has a substantially U-shaped cross section whose rear part is narrowed so as to hide the front part of the support leg. Accordingly, the cover can further effectively cover and hide the support leg. In addition, provision of the support leg in the substantially U-shaped cover prevents the cover from detaching in the forward direction from the support leg.

In the present invention, an attachment groove is formed in both sides of the cover at a position facing an attachment protrusion on the support leg. This prevents the cover from detaching in the forward direction from the support leg.

In the present invention, the attachment protrusion is formed on both sides of the cover at a position facing the attachment groove in the support leg. This prevents the cover from detaching in the forward direction from the support leg.

The present invention also has a support-leg fixing member for securing the support leg at an installation area of support leg on the base. A sliding face is formed on an outer periphery of the support-leg fixing member at a position higher than the top face of the base. A fitting part provided on a lower part of the support leg fits into a holder provided on the support-leg fixing member as the lower end of the support leg contacts and horizontally slides on the sliding face. The support leg is thus secured with the support-leg fixing member.

A structure to secure the support leg on the base by horizontally sliding the support leg prevents the support leg from detaching in the upward direction. It is also easy to move the stand as required. In addition, since the lower end of the support leg contacts the sliding face of the support-leg fixing member disposed at a position higher than the top face of the base when the support leg is horizontally slid, the support leg can be fixed without making scratches on the base. As described later, since the support leg hides the sliding face, a scratch on the sliding face does not matter.

In the present invention, the outer periphery of the lower end of support leg contacts the sliding face in a state that the support leg is secured by the support-leg fixing member. Since the sliding face supports the outer periphery of the lower end of support leg, looseness or tilting of the support leg is preventable.

In the present invention, the support-leg fixing member has a dark color of lightness level 2 or lower, such as black. Therefore, the sliding face of the support-leg fixing member between the base and the outer periphery of the lower end of support leg is not noticeable. Even if the lower end of support leg is noticeable from the rear face or side face of the stand, the base and the support leg look integrated.

If the color is brighter than lightness level 2, an illumination source is reflected. This makes a gap between the base and the lower end of support leg noticeable. Accordingly, the base and the support leg may not look integrated.

In the present invention, the sliding face is 1 mm to 2 mm thick. This thickness is sufficient for supporting a device to be placed on the stand. In addition, this thickness between the base and the outer periphery of the lower end of support leg is not so noticeable. Even if the lower end of support leg is noticeable from the rear face or side face of the stand, the base and the support leg look integrated.

In the present invention, the sliding face short at the front and long at the back relative to the horizontal sliding direction at fixing the support leg. When the lower end of support leg makes contact with the support-leg fixing member, the lower end of support leg can be easily brought into contact with the sliding face because the sliding face is wide at the back relative to the horizontal sliding direction. Still more, since the sliding face is narrow at the front relative to the horizontal sliding direction of the support leg, the sliding face entirely hides under the support leg when the support leg is secured by the support-leg fixing member. This offers a good appearance.

In the present invention, a space is created in vertically-opposing portion where a fitting part of support leg and a holding part of support-leg fixing member face, and the support leg and the support-leg fixing member make contact in an area other than this vertically-opposing portion of the fitting part and holding part. This facilitates engagement of the fitting part of support leg and the holding part of support-leg fixing member. In addition, since no weight of the device is applied to the fitting part of support leg and the holding part of the support-leg fixing member, wear and damage to the fitting part of support leg and the holding part of support-leg fixing member are preventable. A long service life of the stand is thus achievable even if the device is extremely heavy.

In the present invention, an area that the support leg and the support-leg fixing member contact is provided at upper and lower positions relative to the vertically-opposing portion of the fitting part and the holding part. Since the weight of device is received at the upper and lower positions relative to the vertically-opposing portion of the fitting part and the holding part, wear and damage to the fitting part of support leg and the holding part of support-leg fixing member are reliably preventable. A long service life of the stand is thus achievable.

Exemplary embodiments of the present invention are described below with reference to FIGS. 1 to 13C. However, the present invention is not limited to these exemplary embodiments.

(First Exemplary Embodiment)

FIG. 1 illustrates a state where the device is placed on a device-mounting stand in the first exemplary embodiment of the present invention.

As shown in FIG. 1, support legs 3 is disposed on sheet-like base 2 in stand 1. Upper parts of two support legs 3 are linked by connecting member 5 with support bar 4. Cover 6 is provided on the front face of support leg 3. This cover 6 is vertically slidable relative to support leg 3. As device 7, a flat-screen TV set is placed on stand 1.

Figure 2A:
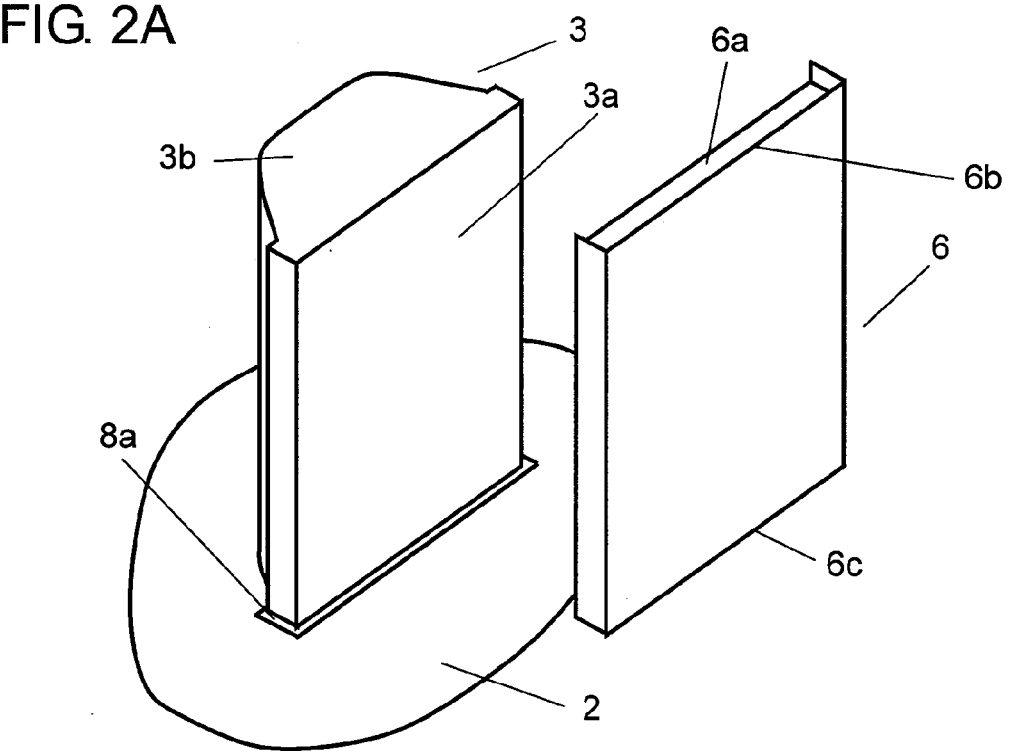
FIG. 2A is an exploded perspective view of a support leg of the device-mounting stand in accordance with the first exemplary embodiment of the present invention.

Next, the structure of support leg 3 and cover 6 is described. As shown in FIG. 2A, support leg 3, disposed on base 2, has rectangular parallelepiped-shaped front part 3a. The cross section of rear part 3b is substantially trapezoidal. The width of rear part 3b of support leg 3 is narrower than that of front part 3a such that rear part 3b is hidden behind front part 3a when support leg 3 is seen from the front.

Cover 6, provided on the front face of support leg 3, has a U-shaped cross section for covering front part 3a of support leg 3 (a cross-sectional shape not illustrated in FIG. 2A). Recessed area 6a is formed on the upper end of cover 6, and front upper end 6b is higher than recessed area 6a.

Since cover 6 hiding front part 3a of support leg 3 is vertically slidable, the upper end of cover 6 can be brought into contact with the lower end of device 7 without any gap. This enables the integration of device 7 and stand 1. Elimination of the gap between device 7 and stand 1 also keeps out dust, eliminating the need for cleaning. In addition, by making front upper end 6b of cover 6 the highest, front upper end 6b of cover 6 reliably contacts the lower end of device 7 without any gap. This enables the reliable integration of device 7 and stand 1.

Figure 2B:
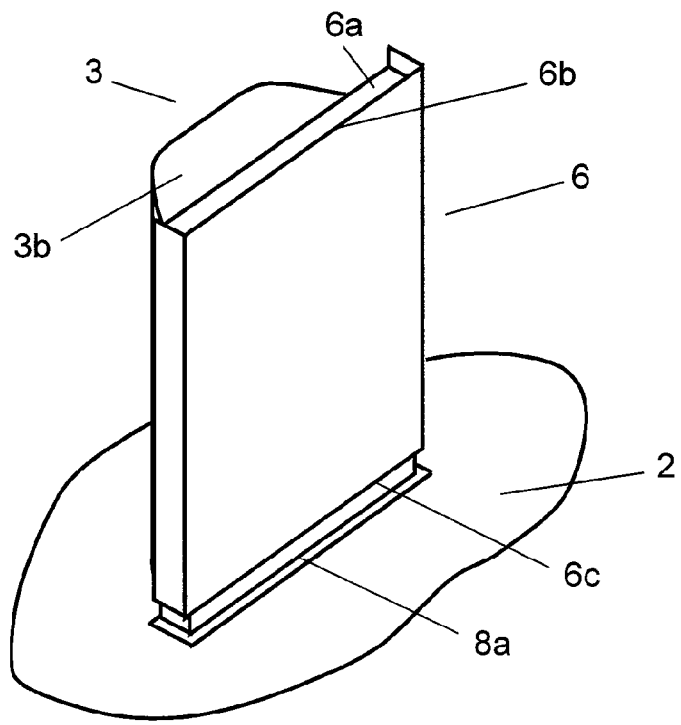
FIG. 2B is a fragmentary perspective view of the support leg of the device-mounting stand in accordance with the first exemplary embodiment of the present invention.

As shown in FIG. 2B, cover 6 is attached to support leg 3 in a vertically slidable manner so as to hide front part 3a (not illustrated in FIG. 2B) of support leg 3.

Groove 8a is formed in base 2, where support leg 3 is disposed, at an installation area where support leg 3 will be disposed. This makes lower end 6c of cover 6 fit into groove 8a when cover 6 is slid downward.

When groove 8a is seen from the top, groove 8a has a shape that corresponds to the cross section of lower end 6c of cover 6, which is substantially U-shaped. The width of groove 8a is set to a dimension that gives an allowance of 0.2 to 0.5 mm in groove 8a around the entire circumference of cover 6 in a state where lower end 6c of cover 6 is fitted into groove 8a so that groove 8a is not so noticeable and lower end 6c of cover 6 smoothly fits into groove 8a.

The depth of groove 8a is set to 2.5 to 3 mm so that lower end 6c of cover 6 can be sunk into groove 8a for about 2 mm. If the depth is over 3 mm, it might cause cracking of groove 8a and result in breaking base 2.

By forming groove 8a, to which lower end 6c of lowered cover 6 enters, in base 2 at the installation area where support leg 3 is disposed, cover 6 that contacts device 7 without any gap looks integrated also with base 2. This achieves the effective integration of device 7 and stand 1. Furthermore, cover 6 has a U-shaped cross section for covering front part 3a of support leg 3. This increases the effect of cover 6 for hiding support leg 3.

Next, a structure for attaching cover 6 to support leg 3 is described with reference to FIGS. 3, 4A, and 4B.

As shown in the drawings, rectangular parallelepiped-shaped attachment protrusion 3c is formed on both side faces of front part 3a of support leg 3. (Only one of attachment protrusions 3c on both sides of front part 3a is shown in FIGS. 3, 4A, and 4B.)

Attachment groove 6e is formed in both sides 6d of cover 6 at a position opposing attachment protrusion 3c of support leg 3. (Only one of the attachment grooves 6e on both sides 6d of cover 6 is shown in FIGS. 3, 4A, and 4B.)

Attachment groove 6e is formed as an L-shape on the rear face (the face not visible from the front) of both sides 6d of cover 6, and has a depth close to the thickness of attachment protrusion 3c of support leg 3.

To attach cover 6 to support leg 3, cover 6 is carried in the direction shown by arrow X (to the back), and then attachment protrusion 3c of support leg 3 is fitted into attachment groove 6e of cover 6. Under conditions where attachment protrusion 3c of support leg 3 hits wall 6f in attachment groove 6e of cover 6 and thus cover 6 cannot be carried in the X direction any more, cover 6 is moved in the direction shown by arrow Y (downward).

By attaching cover 6 to support leg 3 in this way, attachment protrusion 3c of support leg 3 is retained in L-shaped attachment groove 6e of cover 6. Cover 6 thus does not detach in the forward direction from support leg 3. However, since there is a space between upper end 6g of attachment groove 6e in cover 6 and attachment protrusion 3c on support leg 3, vertical movement of cover 6 is practically not restricted by attachment groove 3c.

Figure 3:
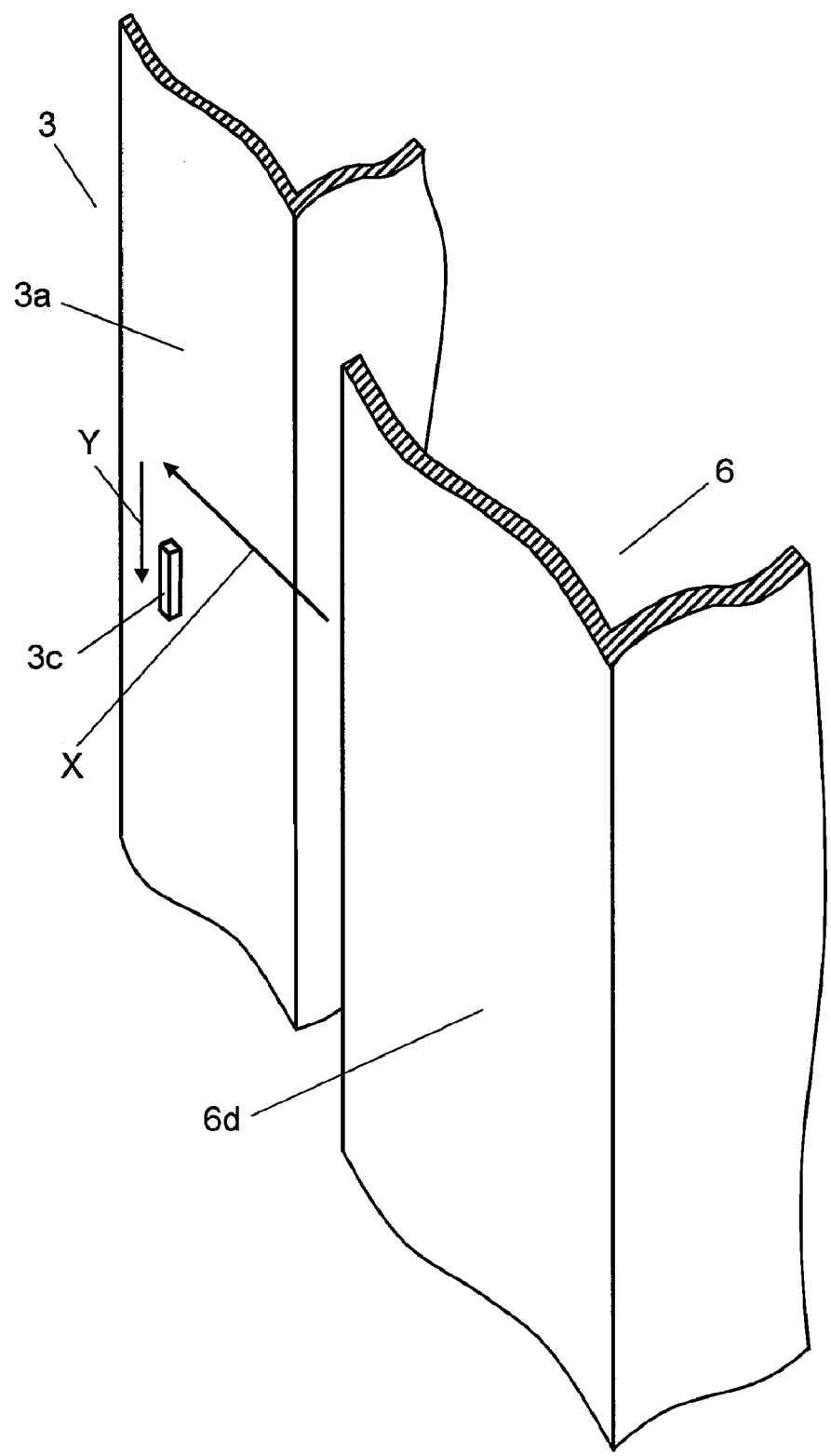
FIG. 3 is a perspective view of a key part for describing how to attach the support leg and cover of the device-mounting stand in accordance with the first exemplary embodiment of the present invention.
Figure 4A:
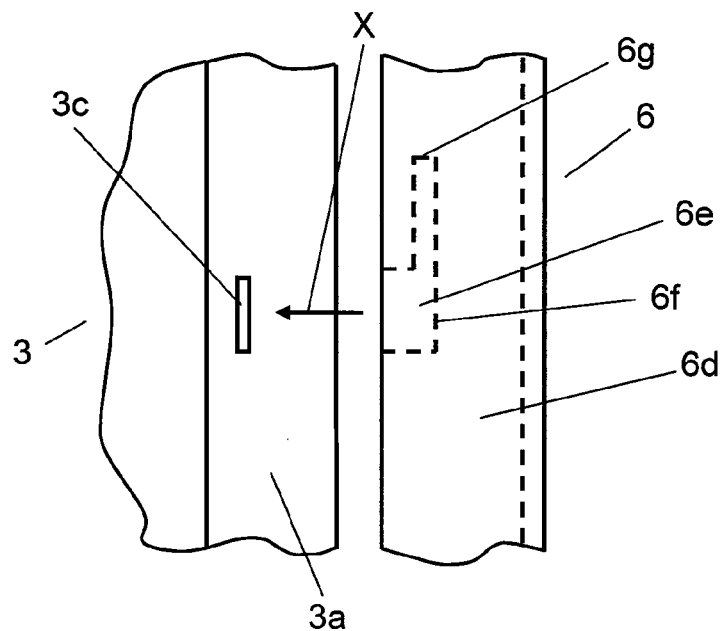
FIG. 4A is a side view of a key part illustrating a state before attaching the support leg and cover of the device-mounting stand in accordance with the first exemplary embodiment of the present invention.
Figure 4B:
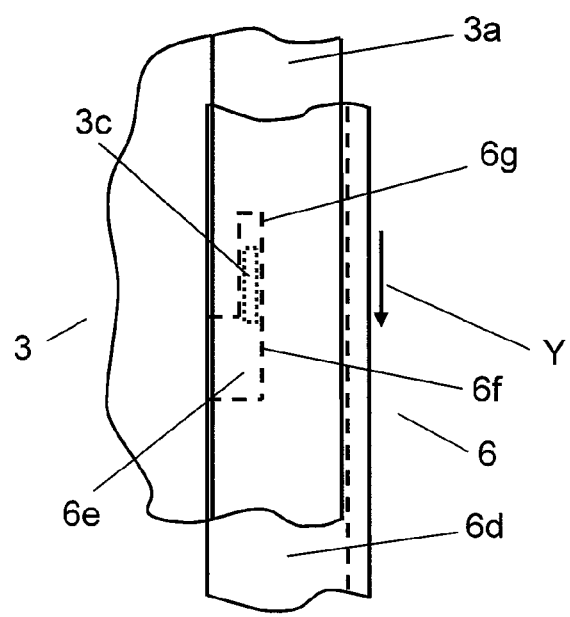
FIG. 4B is a side view of a key part illustrating a state after attaching the support leg and cover of the device-mounting stand in accordance with the first exemplary embodiment of the present invention.

In FIGS. 3, 4A, and 4B, attachment protrusion 3c is formed on support leg 3, and attachment groove 6e is formed in cover 6. Alternatively, an attachment protrusion may be formed on cover 6, and an attachment groove may be formed in support leg 3. This structure also prevents cover 6 from detaching in the forward direction from support leg 3.

(Second Exemplary Embodiment)

A device-mounting stand in the second exemplary embodiment is described below with reference to FIGS. 5A to 7B.

Figure 5A:
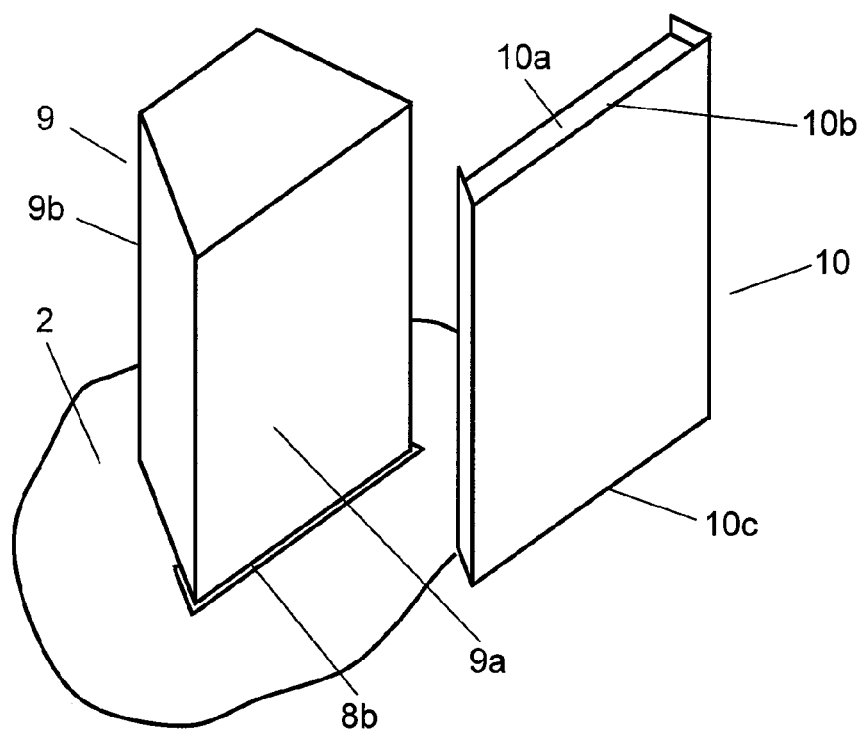
FIG. 5A is an exploded perspective view of a support leg of a device-mounting stand in accordance with a second exemplary embodiment of the present invention.
Figure 5B:
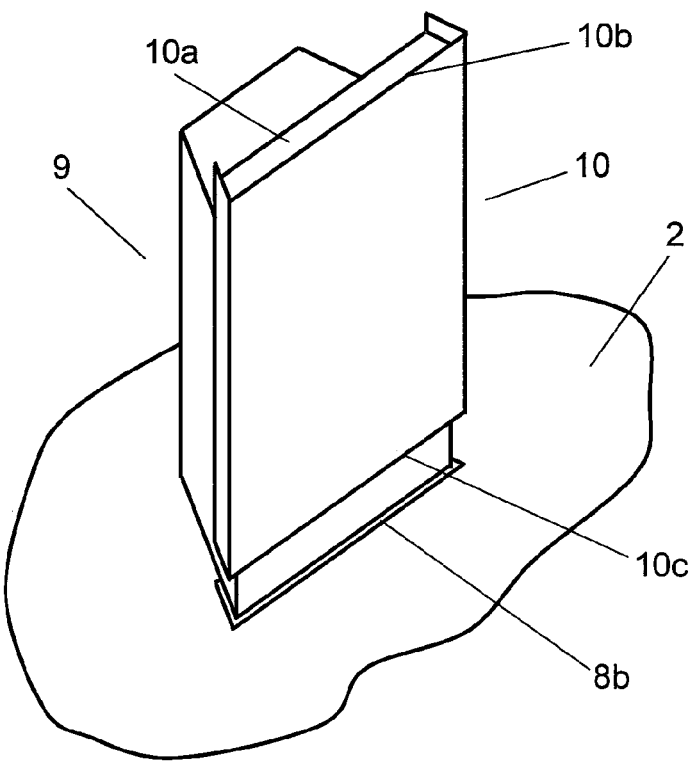
FIG. 5B is a perspective view of the support leg of the device-mounting stand in accordance with the second exemplary embodiment of the present invention.

First, FIGS. 5A and 5B show a structure for attaching support leg 9 and cover 10. As shown in FIG. 5A, the cross section of support leg 9 disposed on base 2 is trapezoidal in which front part 9a is wide and rear part 9b is narrow. Since rear part 9b is narrower than front part 9a, the back of support leg 9 is not noticeable when looking at support leg 9 from the front.

Cover 10 is attached to front part 9a of support leg 9, and has a substantially U-shaped cross section with narrower width at the back (a cross-sectional shape not illustrated in FIG. 5A). Recessed area 10a is formed on the upper end, same as cover 6 shown in FIGS. 2A and 2B. Front upper end 10b is higher than recessed area 10a.

As shown in FIG. 5B, cover 10 is attached to support leg 9 in a vertically slidable manner so as to hide front part 9a of support leg 9 (front part 9a not illustrated in FIG. 5B).

The rear part of cover 10 is narrowed, and the cross section of support leg 9 is made trapezoidal, which is broader at front part 9a. This prevents cover 10 from detaching in the forward direction from support leg 9 when cover 10 is attached to support leg 9. In addition, since support leg 9 has trapezoidal cross section that is broad at front part 9a and narrow at rear part 9b, cover 10 can hide entire support leg 9.

Groove 8b is formed at the installation area where support leg 9 is disposed on base 2. When cover 10 slides downward, its lower end fits into groove 8b.

Groove 8b differs with groove 8a in FIGS. 2A and 2B with respect to its planar shape, which is a U-shape with narrower width at the back. However, the width and depth of groove 8b are the same as that of groove 8a.

Figure 6:
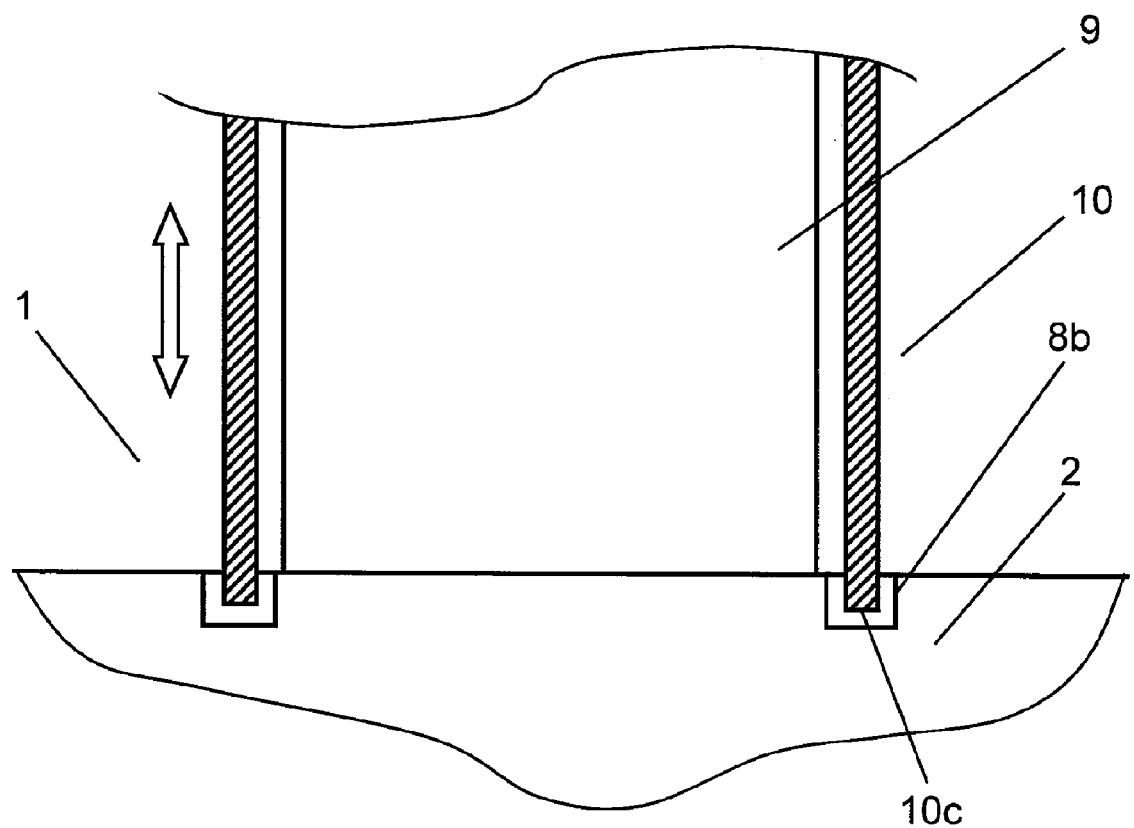
FIG. 6 is a sectional view of a key part illustrating the support leg of the device-mounting stand in accordance with the second exemplary embodiment of the present invention.

FIG. 6 illustrates how lower end 10c of cover 10 provided on support leg 9 in a vertically slidable manner fits into groove 8b in base 2.

With this structure of fitting lower end 10c of cover 10 into groove 8b in base 2, cover 10 can hide the entire front part 9a of support leg 9. This has a visual effect of integrated cover 10 and base 2.

To make the stand lighter or to facilitate molding, support leg 9 and cover 10 are normally formed using resin such as ABS and PS. However, if a device to be placed is heavy, support leg 9 may be formed of metal such as aluminum die-cast.

Cover 10 is not merely provided on support leg 9 in a vertically slidable manner, but it is given an upward force by an elastic device. When a device such as a flat-screen TV set (not illustrated) is placed on support leg 9, front upper end 10b of cover 10 makes contact with the lower end of device 7, and front upper end 1b of cover 10 is pressed downward by the weight of device 7. This makes front upper end 10b of cover 10 and the lower end of device 7 contact without any gap. In addition, elimination of the gap between device 7 and stand 1 keeps out dust, eliminating the need for cleaning.

Figure 7A:
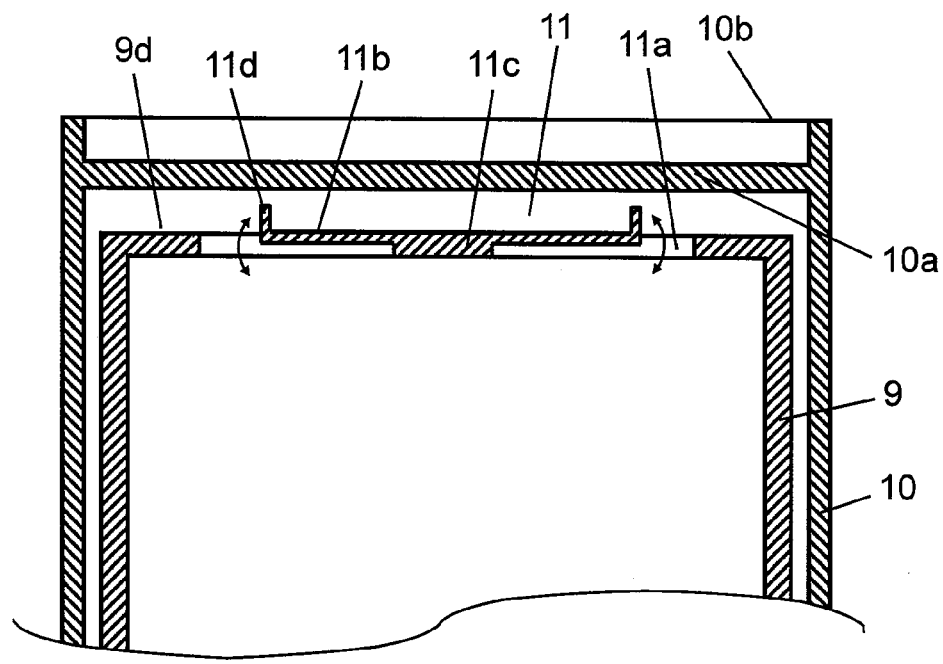
FIG. 7A is a sectional view of a key part of the support leg of the device-mounting stand in accordance with the second exemplary embodiment of the present invention.
Figure 7B:
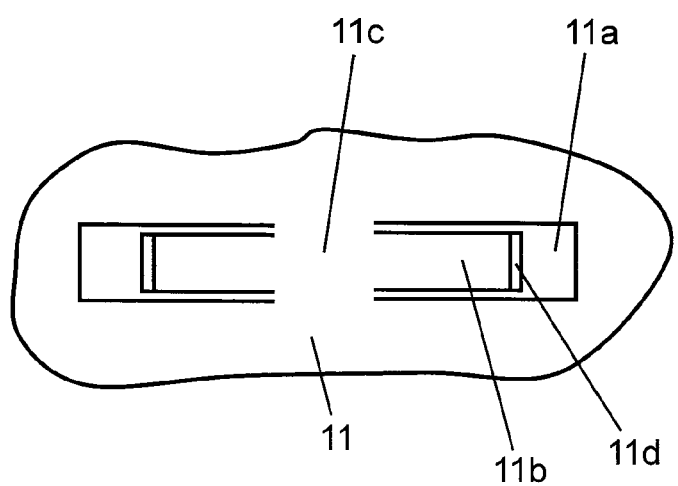
FIG. 7B is a plan view of a key part illustrating an upper end of the support leg of the device-mounting stand in accordance with the second exemplary embodiment of the present invention.

The elastic device that applies an upward force to cover 10 is described next with reference to FIGS. 7A and 7B. FIGS. 7A and 7B illustrate an example of integrally forming elastic device 11 with upper end 9d of support leg 9.

As shown in the drawings, elastic device 11 formed on upper end 9d of support leg 9 includes U-shaped hole 11a, elastic part 11b surrounded by hole 11a, fixing part 11c that supports elastic part 11b in a vertically oscillatable manner, and contact part 11d formed upward on an end of elastic part 11b. A tip of contact part 11d contacts the bottom face of recessed area 10a that formed on the upper end of cover 10, and formed at a lower position than front upper end 10b.

The length, width, and thickness of elastic part 11b are selected and formed in accordance with a material used so as to have an appropriate hardness and viscosity. Therefore, if a vertical force is applied to the end of elastic part 11b, which is contact part 11d, a portion from a part connected with fixing part 11c to elastic part 11b bend upward or downward.

Then, depending on its hardness, a recovery force that acts to return to the original state is generated as elastic part 11b bends. This recovery force is the elastic force of elastic part 11b. By integrally forming elastic device 11 with support leg 9, elastic device 11 does not have to be handled as a separate component. This achieves easier assembly.

In FIG. 7A, contact part 11d and recessed area 10a are illustrated as if they are not in contact, in order to provide a clear image of the structure of elastic device 11. However, when cover 10 is attached to support leg 9, contact part 11d and recessed area 10a are brought into contact by the weight of cover 10. When contact part 11d and the bottom face of recessed area 10a contact, about a 3-mm space is secured between the bottom face of recessed area 10a and the upper end face of support leg 9 by the height of contact part 11d.

(Third Exemplary Embodiment)

Figure 8A:
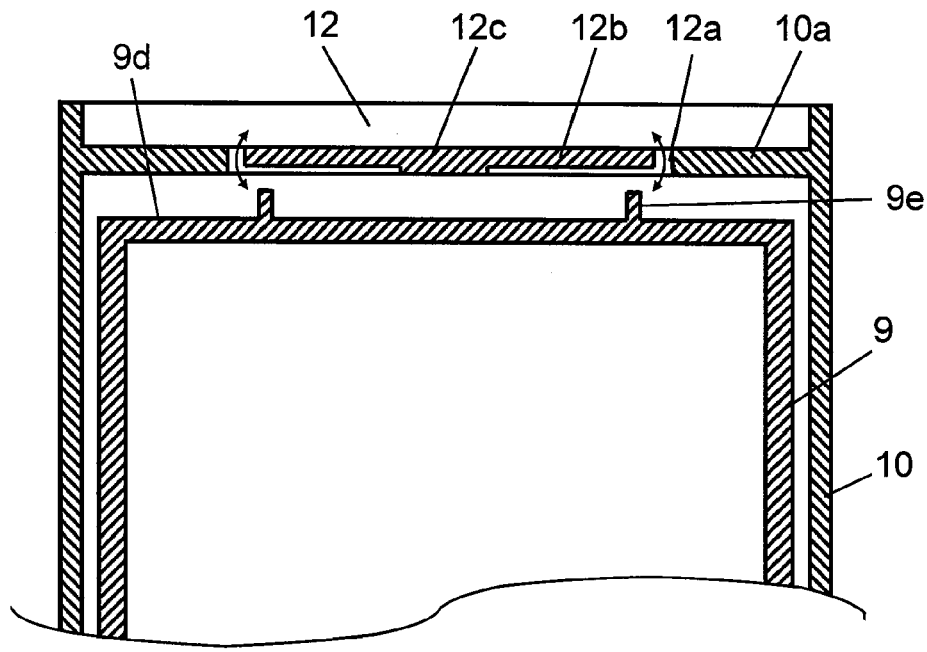
FIG. 8A is a sectional view of a key part illustrating a support leg of a device-mounting stand in accordance with a third exemplary embodiment of the present invention.
Figure 8B:
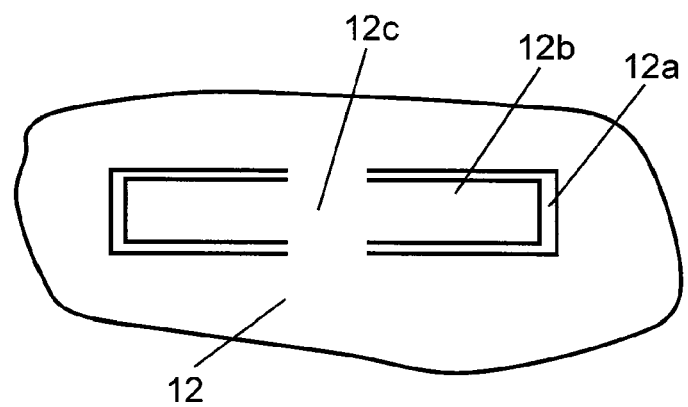
FIG. 8B is a plan view of a key part illustrating an upper end of the support leg of the device-mounting stand in accordance with the third exemplary embodiment of the present invention.

A device-mounting stand in the third exemplary embodiment is described with reference to FIGS. 8A to 10B. FIGS. 8A and 8B give an example of integrally forming elastic device 12 with recessed area 10a of cover 10.

Elastic device 12 formed on recessed area 10a of cover 10 includes U-shaped hole 12a, elastic part 12b surrounded by hole 12a, and fixing part 12c supporting elastic part 12b in a vertically oscillatable manner. The bottom face of elastic part 12b contacts a tip of protrusion 9e formed on upper end 9d of support leg 9. When the bottom face of elastic part 12b and protrusion 9e contact, a space of about 3 mm is secured between the bottom face of recessed area 10a of cover 10 and the upper end face of support leg 9 by the height of protrusion 9e.

The length, width, and thickness of material for elastic part 12b are selected in order that elastic part 12b will have appropriate hardness and viscosity. Therefore, elastic part 12b bends upward or downward from a portion connected with fixing part 12c when a vertical force is applied to an end of elastic part 12b.

Depending on hardness of elastic part 12b, a recovery force that acts to return to the original state is generated as elastic part 12b is bent. This recovery force is an elastic force of elastic part 12b. Elastic device 12 is integrally formed with cover 10, and thus there is no need to handle elastic device 12 as a separate component. This achieves easier assembly.

In FIG. 8A, protrusion 9e and elastic part 12b are illustrated as if they are not in contact, in order to provide a clear image of the structure of elastic part 12. However, when cover 10 is attached to support leg 9, protrusion 9e and the bottom face of recessed area 10a of cover 10 are brought into contact by the weight of cover 10.

Figure 9:
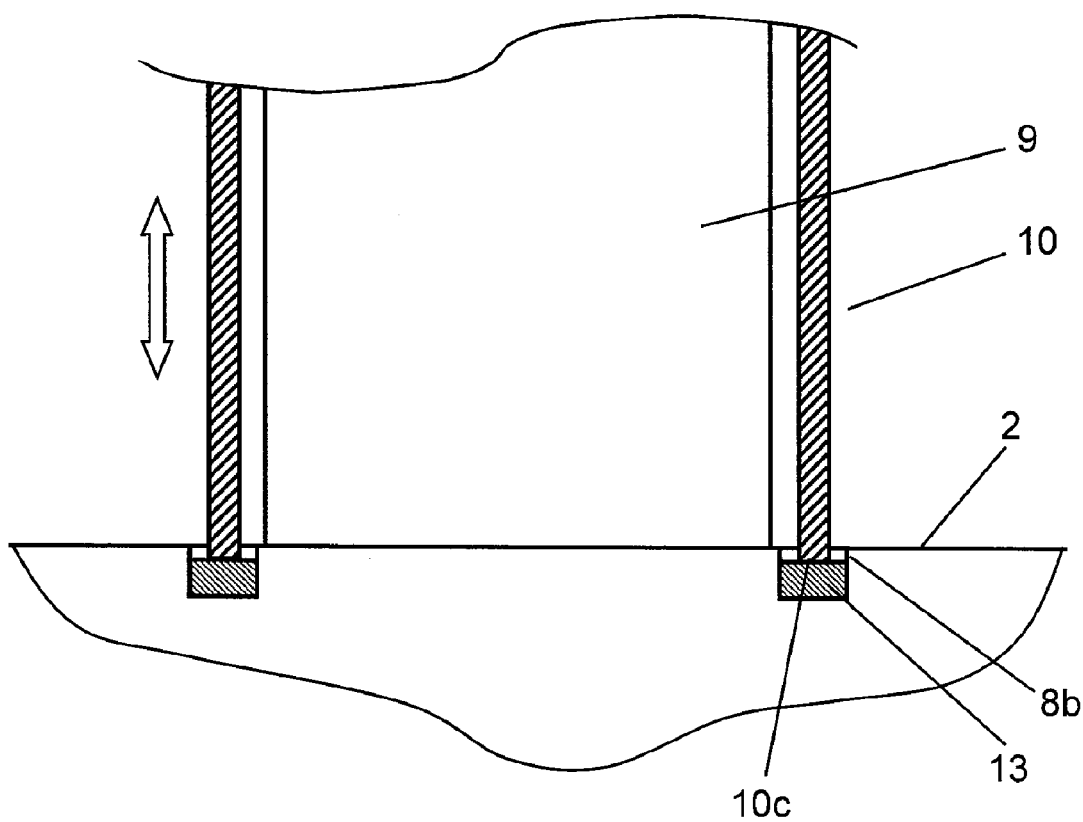
FIG. 9 is a sectional view of a key part illustrating the support leg of the device-mounting stand in accordance with the third exemplary embodiment of the present invention.

FIG. 9 is an example of providing second elastic device 18 in groove 8b. Second elastic device 13 is provided in groove 8b formed in base 2. Second elastic device 13 is made of an elastic material, such as rubber, and has elasticity that scarcely deforms by the weight of cover 10. Second elastic device 13 is provided between the lower end of cover 10 and groove 8b. This offers the structure that makes dust difficult to enter groove 8b.

When device 7 (not illustrated) is lowered toward support leg 9, front upper end 10b (not illustrated) of cover 10 contacts the lower end of device 7. Cover 10 then enters groove 8b formed in base 2 against second elastic device 13 until device 7 is placed on connecting member 5 (not illustrated, see FIG. 1) on support leg 9.

In this structure, cover 10 slidably moves downward against second elastic device 13, and the lower end of cover 10 enters groove 8b formed in base 2 by making the lower end of device 7 contact cover 10. Cover 10 thus hides the entire front face of support leg 9. Accordingly, cover 10 contacting device 7 without any gap looks integrated also with base 2. Device 7 and stand 1 can thus be effectively integrated.

When device 7 is placed on connecting member 5 on support leg 9, cover 10 stops sliding downward, and front upper end 10b of cover 10 is pushed against the lower end of device 7 by the recovery force of second elastic device 13. As a result, no gap is created at a contact area of cover 10 and device 7. Accordingly, device 7 and cover 10 are integrated, and consequently, device 7 and stand 1 (an entire image is not illustrated) are also integrated.

Next, a structure in which cover 10 and device 7, such as a flat-screen TV set, placed on the stand are making contact without any gap is described with reference to FIGS. 10A and 10B. Elastic device 12 described in FIGS. 8A and 8B are used as an example for description.

Figure 10A:
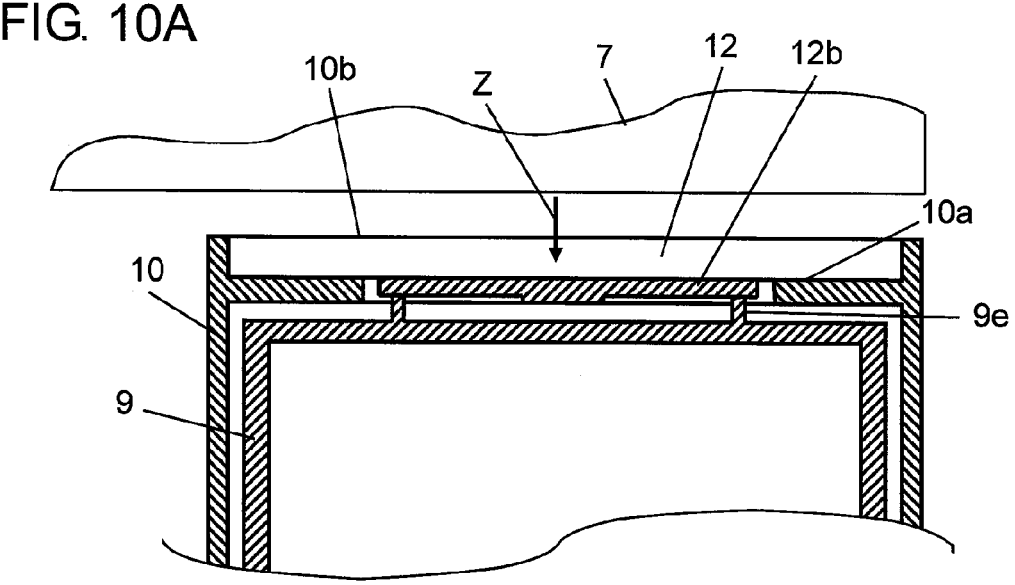
FIG. 10A is a sectional view of a key part illustrating a state before placing the device on the device-mounting stand in accordance with the third exemplary embodiment of the present invention.
Figure 10B:
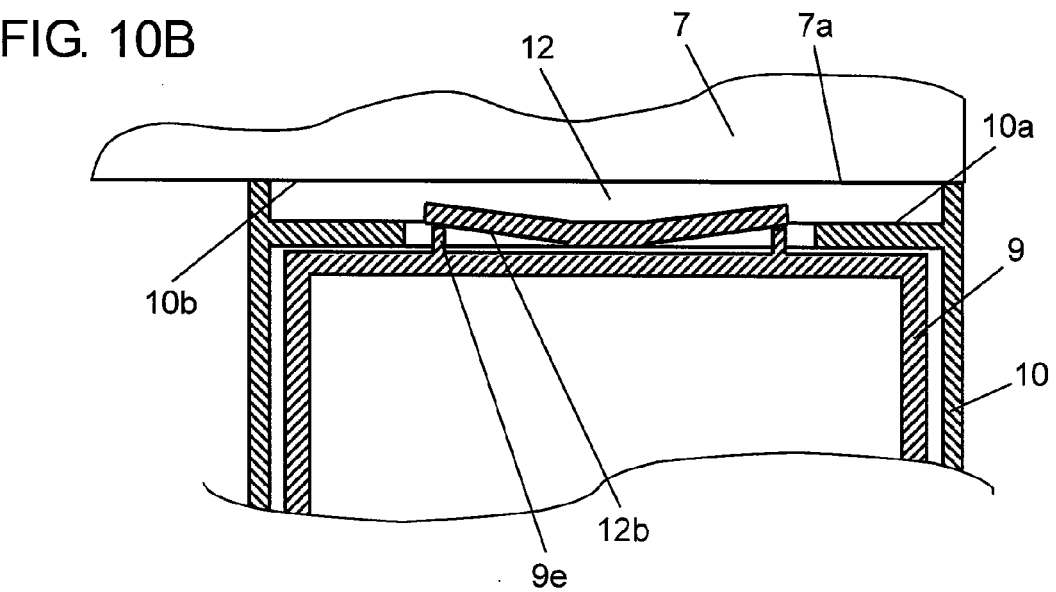
FIG. 10B is a sectional view of a key part illustrating a state after placing the device on the device-mounting stand in accordance with the third exemplary embodiment of the present invention.

As shown in FIG. 10A, elastic part 12b of elastic device 12 of cover 10 is scarcely deformed before device 7 is mounted, although elastic part 12b is in contact with protrusion 9e of support leg 9.

When device 7 is carried in the direction shown by arrow Z (downward), device 7 itself is supported by support leg 9 via connecting member 5 (not illustrated), but the position of lower end 7a of device 7 becomes lower than the position of front upper end 10b of cover 10 shown in FIG. 10A. As a result, cover 10 slides downward against elastic device 12.

An end of elastic part 12b of elastic device 12 contacts protrusion 9e of support leg 9, and bends upward, and elastic part 12b tries to cancel this bending by the recovery force of elastic part 12b, as described above. This action gives an upward force to cover 10, and thus front upper end 10b of cover 10 makes contact with lower end 7a of device 7 without any gap. Cover 10 is movable for up to 2 mm in upward or downward direction. Elastic part 12b is also formed such that its end can bend upward for up to 2 mm under the expected weight of device.

Front upper end 10b of cover 10 is formed at the highest position by forming recessed area 10a. Accordingly, lower end 7a of device 7 makes contact with front upper end 10b of cover 10 without fail. No gap is thus noticeable when looking at the contact portion of stand 1 and device 7 from the front.

Although not illustrated, the front upper end of cover 10 is on a face extended from the front face of lower end 7a of device 7. Accordingly, the front face of device 7 and the front face of cover 10 configure a flat continued face, achieving the integration of device 7 and the stand 1.

(Fourth Exemplary Embodiment)

A device-mounting stand in the fourth exemplary embodiment of the present invention is described below with reference to FIGS. 11 to 13C.

Figure 11:
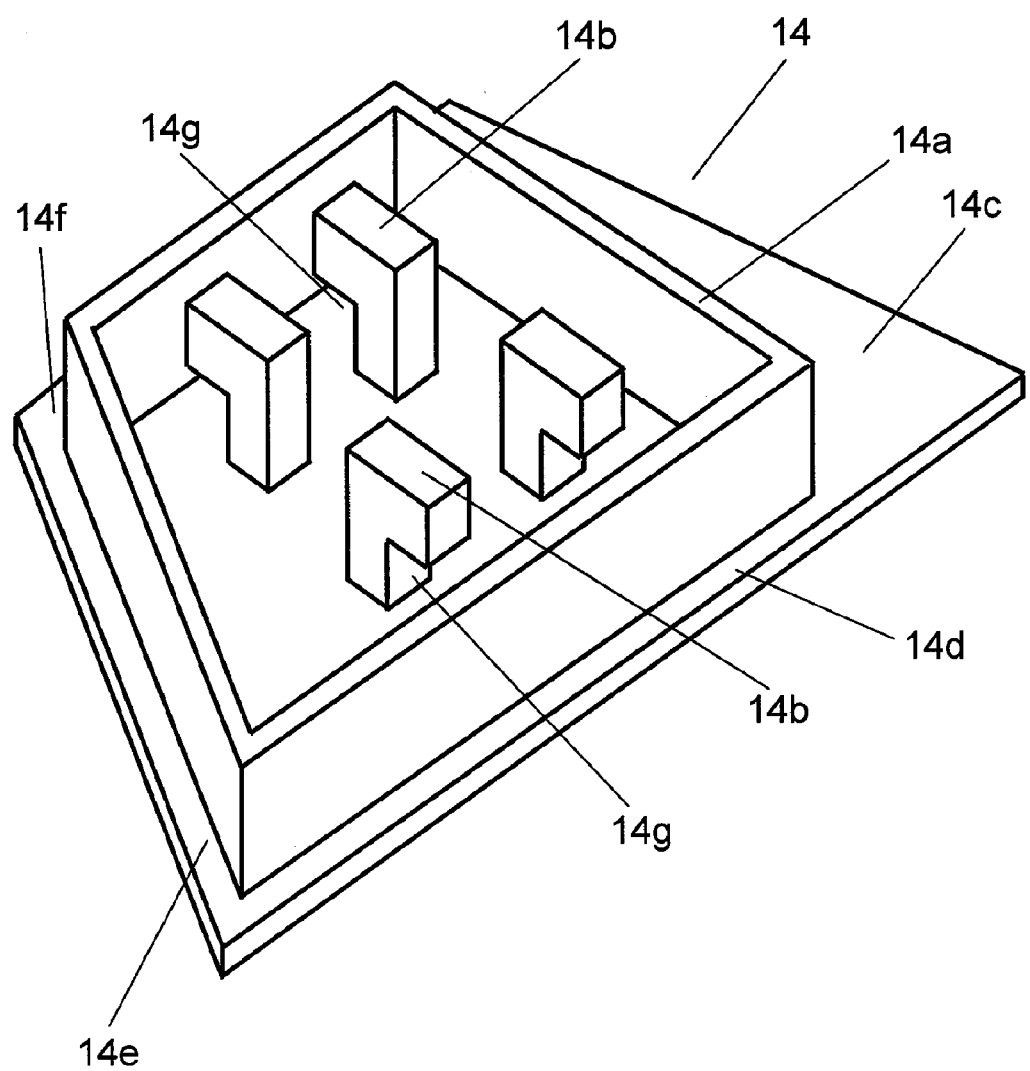
FIG. 11 is a perspective view of a support-leg fixing member of a device-mounting stand in accordance with a fourth exemplary embodiment of the present invention.
Figure 12:
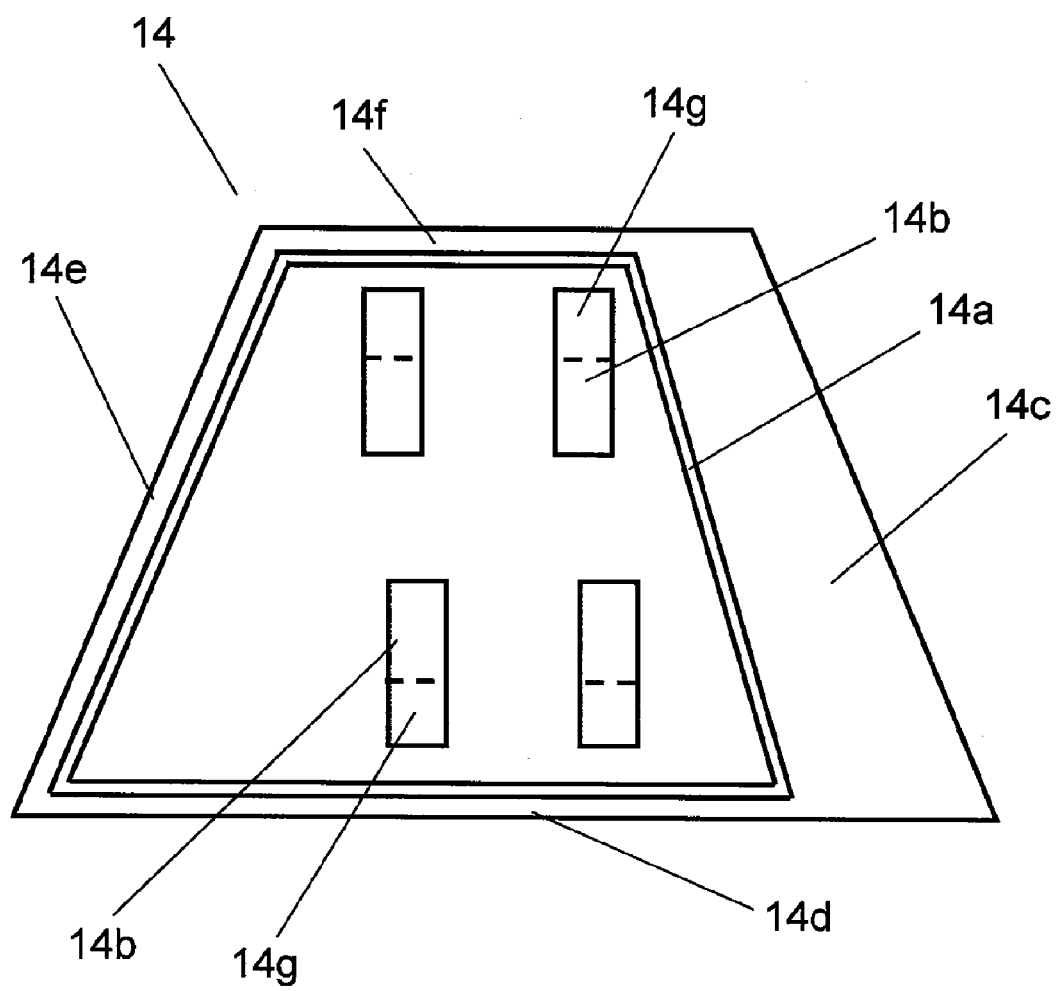
FIG. 12 is a plan view of a support-leg fixing member of the device-mounting stand in accordance with the fourth exemplary embodiment of the present invention.

First, a support-leg fixing member used for fixing the support leg onto the stand is described with reference to FIGS. 11 and 12.

As shown in the drawings, if support-leg fixing member 14 is support-leg fixing member 14 for fixing support leg 9 shown in FIG. 5, its bottom face has a trapezoidal shape same as a cross section of support leg 9. This support-leg fixing member 14 includes frame 14a, multiple L-shaped holders 14b formed inside frame 14a, and sheet-like sliding faces 14c to 14f formed on the outer periphery. A part of holder 14b is notched to form holding part 14g.

A dark color, such as black, is used for support-leg fixing member 14 so as to avoid a sense of discomfort even if cover 10 is too short to reach groove 8b when cover 10 is attached to support leg 9. This makes base 2 (not illustrated) and support leg 9 look integrated even if the lower end of support leg 9 (not illustrated) is noticeable from the rear face or side face of the stand.

Frame 14a has a function to receive the weight of support leg 9 (not illustrated) and device 7 (not illustrated), and also a function to prevent damage to holder 14b by reducing a force, in particular, a horizontal force, applied to holder 14b.

Sliding faces 14c to 14f are 1 mm to 2 mm thick, and are formed such that they become higher than the top face of base. Their thickness is sufficient for supporting device 7 to be placed, and is also not so noticeable when sliding faces 14c to 14f appear between base 2 (not illustrated) and the outer periphery of the lower end of support leg 9 (not illustrated). Accordingly, base 2 and support leg 9 look integrated even if the lower end of support leg is noticeable from the rear face or side face of the stand. In addition, areas of sliding faces 14c to 14f differ depending on their positions. This is related to the fixing method of support leg, and is thus described with reference to FIG. 12.

Support-leg fixing member 14 needs to fix support leg 9 in a correct position by positioning support leg 9 at an appropriate position on base 2 (not illustrated) in accordance with the shape of device 7 to be placed on stand 1 (not illustrated), and also fixing support leg 9 upright in the right direction.

To fix support leg 9 at the appropriate position on base 2, a positioning hole is created in either support-leg fixing member 14 or base 2, and a positioning protrusion to be inserted into the positioning hole is formed on the other. Support-leg fixing member 14 is fixed at the appropriate position on base 2 by inserting the positioning protrusion into the positioning hole. Screwing, adhesion using adhesive, welding, and so on are also applicable for fixing. Alternatively, support-leg fixing member 14 may be integrally formed with base 2.

A process for fixing support leg 9 onto support-leg fixing member 14 is described next with reference to FIGS. 13A to 13C.

Figure 13A:
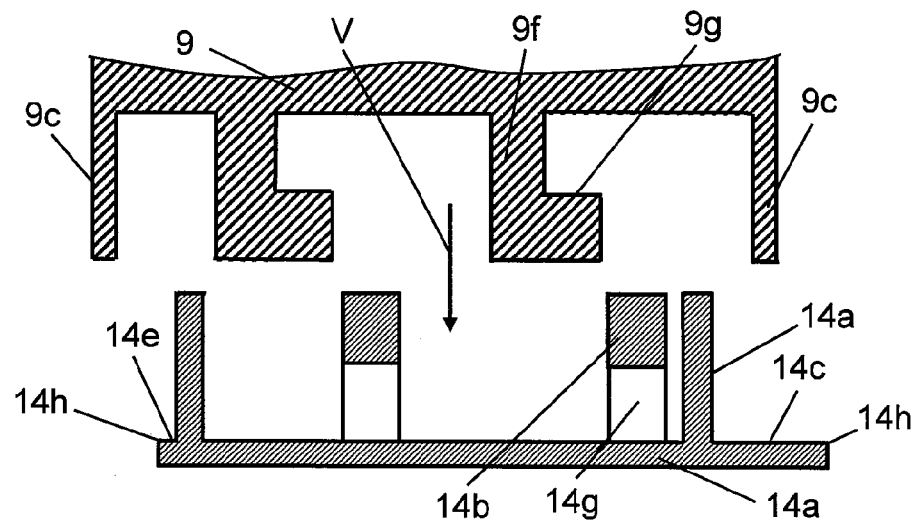
FIG. 13A is a sectional view illustrating a state before fixing the support leg and the support-leg fixing member of the device-mounting stand in accordance with the fourth exemplary embodiment of the present invention.

As shown in FIG. 13A, frame 9c is also formed on a bottom part of support leg 9. L-shaped fitting device 9f is formed inside frame 9c, and fitting part 9g is formed on an end of fitting device 9f.

Support leg 9 is lowered in the direction shown by arrow V toward support-leg fixing member 14. As shown in FIG. 13B, a part of frame 9c is brought into contact with the broadest sliding face 14c in support-leg fixing member 14.

Here, at least frame 14a of support-leg fixing member 14 contacts support leg 9, but frame 9c of support leg 9 does not contact the narrowest sliding face 14e at a position opposing sliding face 14c.

Figure 13B:
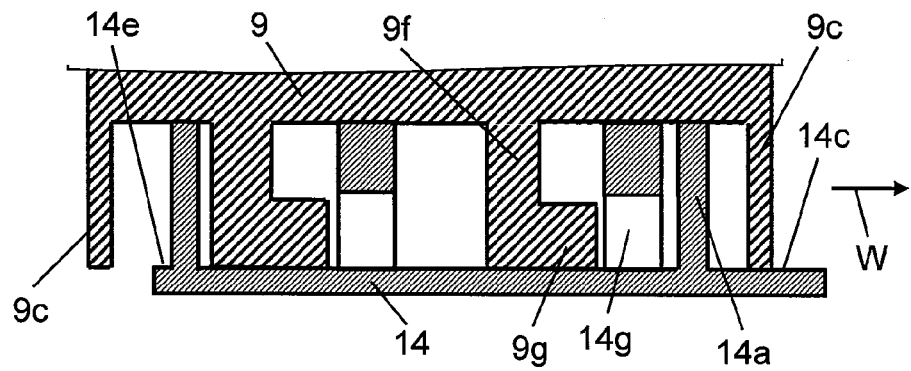
FIG. 13B is a sectional view illustrating a fixing operation of the support leg and the support-leg fixing member of the device-mounting stand in accordance with the fourth exemplary embodiment of the present invention.
Figure 13C:
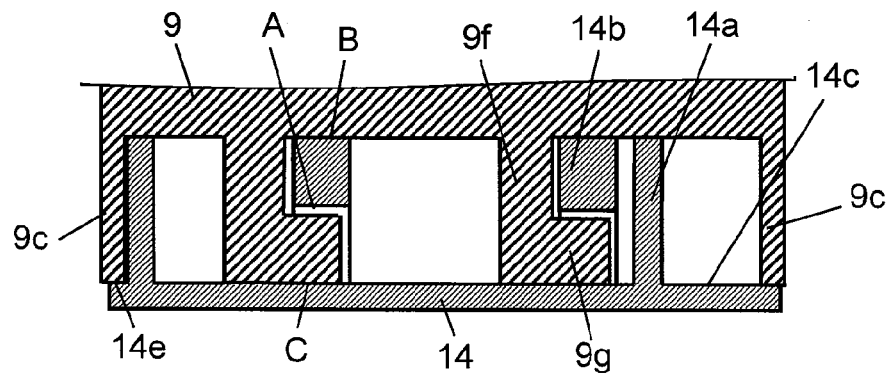
FIG. 13C is a sectional view illustrating a fixing state of the support leg and the support-leg fixing member of the device-mounting stand in accordance with the fourth exemplary embodiment of the present invention.
Figure 14A:
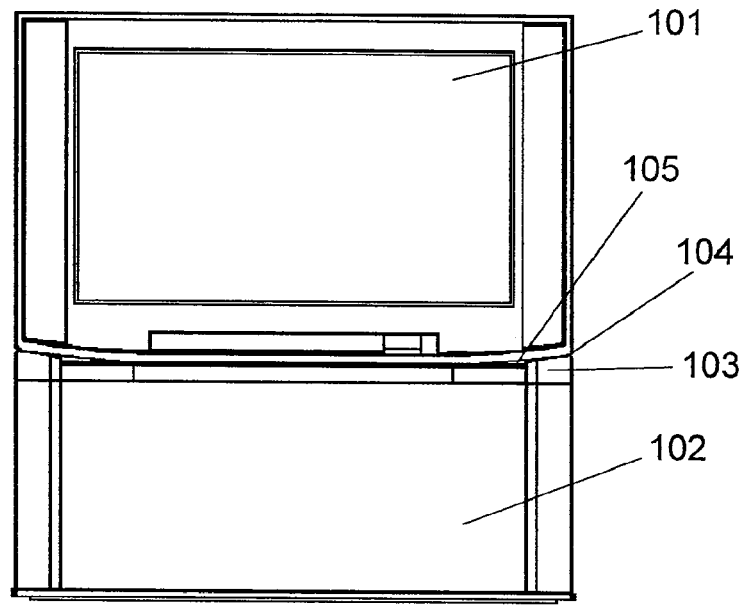
FIG. 14A is a front view illustrate state that a device is placed on a conventional device-mounting stand.
Figure 14B:
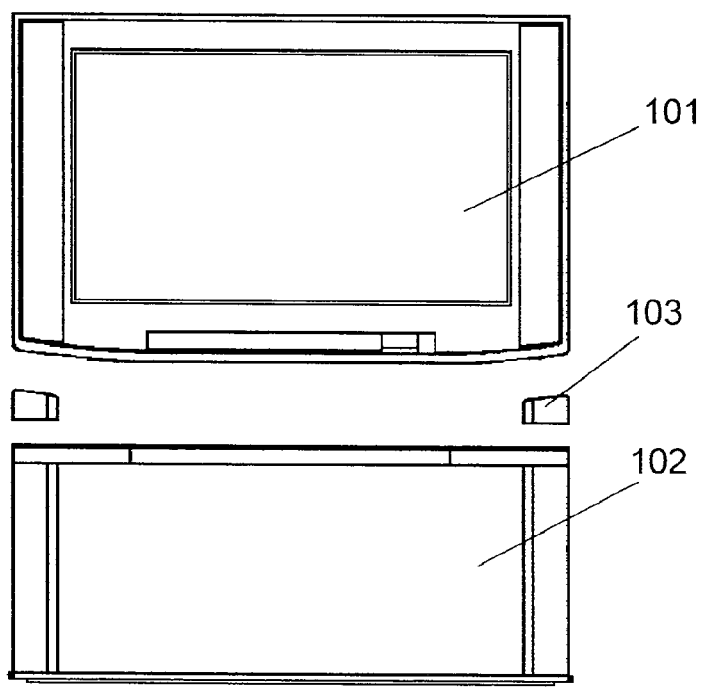
FIG. 14B is an exploded front view illustrating a state that the device is placed on the conventional device-mounting stand.

In FIG. 13B, when support leg 9 is horizontally slid in the direction shown by arrow W, frame 9c of support leg 9 horizontally slides on broad sliding face 14c, and fitting part 9g formed on an end of fitting device 9 engages with holding part 14g, as shown in FIG. 13C. When support leg 9 is horizontally slid to the end, frame 9c of support leg 9 also contacts sliding face 14e at a position opposing sliding face 14c.

This horizontal sliding of frame 9c of support leg 9 on sliding face 14c avoids making scratches on base 2 (not illustrated). In addition, sliding face 14e at front is short and sliding face 14c at back is long in sliding faces 14c to 14f, relative to the horizontal sliding direction on fixing the support leg. This facilitates placement of frame 9c of support leg 9 on broad sliding face 14c, and thus support leg 9 can be easily fixed. With this structure of horizontally sliding support leg 9 and fixing it on base 2 (not illustrated) via support-leg fixing member 14, support leg 9 will not detach in the upward direction from base 2, and the stand can be easily handled to move it to a different place.

Still more, provision of a narrow sliding face, such as sliding face 14e, in the horizontal sliding direction of support leg 9 hides all sliding faces 14c to 14f behind frame 9c of support leg 9 when support leg 3 is fixed. This offers extremely good appearance.

Still more, even if sliding faces 14c to 14f are scratched by frame 9c of support leg 9, all sliding faces 14c to 14f hide behind frame 9c when support leg 9 is fixed. Accordingly, there is no problem.

In the state shown in FIG. 13C, entire frame 9c of support leg 9 is placed on one of sliding faces 14c to 14f. Accordingly, support leg 9 can be retained at the correct upright position in a very stable manner. This prevents looseness or tilting of support leg 9.

The outline of sliding faces 14c to 14f is about 0.5 mm smaller than frame 9c of support leg 9. Accordingly, all sliding faces 14c to 14f hide behind frame 9c although entire frame 9c is placed on sliding faces 14c to 14f.

Space A is created in an opposing face of fitting part 9g and holding part 14g in an engaged portion of fitting part 9g and holding part 14g. Support leg 9 and support-leg fixing member 14 are brought into contact without any gap at upper and lower parts, such as contact faces B and C, of the opposing face of fitting part 9g and holding part 14g.

Accordingly, the weight of device 7 (not illustrated) is not applied to the opposing face of fitting part 9g and holding part 14g. Damage or wear thus unlikely occurs, achieving a longer service life of stand 1.

Corners 14h (indicated in FIG. 13A) of sliding faces 14c to 14f of support-leg fixing member 14 are chamfered (R0.1 to 0.3 mm). This structure facilitates placement of frame 9c of support leg 9 on sliding face 14e in the horizontal sliding operation of support leg 9. Still more, chamfering interrupts the light from reaching edges of sliding faces 14c to 14f of support-leg fixing member 14 under frame 9c of support leg 9. This makes support-leg fixing member 14 between support leg 9 and base 2 difficult to notice. As a result, support leg 9 and base 2 can be integrated.

In the above exemplary embodiments, support leg 9 has a trapezoidal cross section. However, as long as cover 6 can hide support leg, any shape, including semi-circular cross section and triangular cross section, is selectable.

Industrial Applicability

The device-mounting stand of the present invention offers the integration of a device to be placed and the stand. This is applicable to a range of devices including flat-screen TV sets and monitors.

The invention is claimed is:

1. A device-mounting stand comprising:
   a base;
   a support leg for supporting a device, the support leg being placed on the base; and
   a cover for covering a front part of the support leg, the cover being disposed on the support leg in a vertically slidable manner such that the cover is configured to be selectively positioned at various fixed elevations along the support leg including an elevation where a top surface of the cover is brought into contact with a lower end of a device;
   an elastic device for applying an upward force to the cover to move the cover in an upward direction, wherein the top surface of the cover is brought into contact with the lower end of the device;
   wherein the base has a groove formed at an installation area of the support leg, a lower end of the cover lowering against the elastic device being fitted into the groove.

2. The device-mounting stand of claim 1, wherein the elastic device is integrally formed with the support leg.

3. The device-mounting stand of claim 1, wherein the elastic device is integrally formed with the cover.

4. The device-mounting stand of claim 1, wherein the elastic device is disposed between a lower end of the cover and a bottom of the groove.

5. The device-mounting stand of claim 1, wherein the support leg has a narrower width at its rear part than a width at its front part so as to hide the rear part of the support leg behind the front part.

6. The device-mounting stand of claim 1, wherein the cover has a U-shaped cross section so as to cover the front part of the support leg.

7. The device-mounting stand of claim 1, wherein the cover has a substantially U-shaped cross section with a narrower width at its rear part so as to cover the front part of the support leg.

8. The device-mounting stand of claim 1, wherein an attachment groove is formed on both sides of the cover at a position facing an attachment protrusion of the support leg.

9. The device-mounting stand of claim 1, wherein an attachment protrusion is formed on both sides of the cover at a position facing an attachment groove of the support leg.

10. The device-mounting stand of claim 1, wherein a support-leg fixing member for fixing the support leg is provided on the installation area of the support leg on the base,
    a sliding face is formed on an outer periphery of the support-leg fixing member, the sliding face being higher than a top face of the base, and
    the support-leg fixing member fixes the support leg by engaging a fitting part provided on a bottom part of the support leg with a holding part provided on the support-leg fixing member as a lower end of the support leg is brought into contact with the sliding face and horizontally slid.

11. The device-mounting stand of claim 10, wherein an outer periphery of the lower end of the support leg contacts the sliding face in a state that the support leg is fixed by the support-leg fixing member.

12. A device-mounting stand comprising:
a base;
a support leg for supporting a device, the support leg being placed on the base; and
a cover for covering a front part of the support leg, the cover being disposed on the support leg in a vertically slidable manner such that the cover is configured to be selectively positioned at various fixed elevations along the support leg including an elevation where a top surface of the cover is brought into contact with a lower end of a device;
an elastic device for applying an upward force to the cover to move the cover in an upward direction, wherein the top surface of the cover is brought into contact with the lower end of the device;
wherein a support-leg fixing member for fixing the support leg is provided on the installation area of the support leg on the base,
the support-leg fixing member fixes the support leg by engaging a fitting part provided on a lower part of the support leg with a holding part provided on the support-leg fixing member as the bottom part of the support leg is brought into contact with the support-leg fixing member and horizontally slid,
a space is created in a vertically-opposing portion of the fitting part of the support leg and the holding part of the support-leg fixing member, and
the support leg and the support-leg fixing member contact at a plurality of points.

* * * * *

UNITED STATES PATENT AND TRADEMARK OFFICE
CERTIFICATE OF CORRECTION

| | | |
|---|---|---|
| PATENT NO. | : 8,123,184 B2 | |
| APPLICATION NO. | : 12/446522 | |
| DATED | : February 28, 2012 | |
| INVENTOR(S) | : Masatoshi Hori | |

It is certified that error appears in the above-identified patent and that said Letters Patent is hereby corrected as shown below:

On the Title Page:

Item [56], FOREIGN PATENT DOCUMENTS, please delete duplicate reference, "JP2000341608A 12/2000".

Item [57], ABSTRACT, "A device-mounted stand" should read -- A device-mounting stand --.

Signed and Sealed this
Tenth Day of July, 2012

David J. Kappos
*Director of the United States Patent and Trademark Office*